(12) United States Patent
Lindemann et al.

(10) Patent No.: US 9,961,639 B2
(45) Date of Patent: May 1, 2018

(54) METHOD AND APPARATUS FOR NOTIFYING MISSED EVENTS

(71) Applicant: THOMSON LICENSING, Issy de Moulineaux (FR)

(72) Inventors: Robert Lindemann, Hannover (DE); Meik Huber, Stuttgart (DE); Anton Werner Keller, Arni (CH)

(73) Assignee: Thomson Licensing (FR)

(*) Notice: Subject to any disclaimer, the term of this patent is extended or adjusted under 35 U.S.C. 154(b) by 148 days.

(21) Appl. No.: 14/768,545

(22) PCT Filed: Feb. 11, 2014

(86) PCT No.: PCT/EP2014/052582
§ 371 (c)(1),
(2) Date: Aug. 18, 2015

(87) PCT Pub. No.: WO2014/128021
PCT Pub. Date: Aug. 28, 2014

(65) Prior Publication Data
US 2016/0007290 A1    Jan. 7, 2016

(30) Foreign Application Priority Data
Feb. 19, 2013  (EP) .................................... 13305185

(51) Int. Cl.
*G01R 31/08* (2006.01)
*H04L 5/14* (2006.01)
(Continued)

(52) U.S. Cl.
CPC ... *H04W 52/0229* (2013.01); *H04M 1/72569* (2013.01); *H04M 19/04* (2013.01);
(Continued)

(58) Field of Classification Search
CPC ......... H04W 52/0229; H04W 52/0254; H04W 68/02; H04W 68/12
See application file for complete search history.

(56) References Cited

U.S. PATENT DOCUMENTS

| 8,180,583 B1 | 5/2012 | Gossweiler et al. |
| 8,260,367 B2 | 9/2012 | Chan |

(Continued)

FOREIGN PATENT DOCUMENTS

| CN | 102006356 | 4/2011 |
| GB | 2316574 | 2/1998 |

(Continued)

OTHER PUBLICATIONS

European Search Report dated Jun. 10, 2013.
International Search Report dated Jul. 4, 2014.

*Primary Examiner* — Faruk Hamza
*Assistant Examiner* — Abu-Sayeed Haque
(74) *Attorney, Agent, or Firm* — Jack Schwartz & Associates, PLLC

(57) ABSTRACT

A method of operating a device for indicating an event notification to a user comprises indicating a new event through accordingly controlling visual, audible and/or tactile indicators. A user input is received in response to the indicated event. In case a user input in response to the indicated event is not received within a first time period, sensors in the device are controlled to monitor ambient conditions and determine corresponding pattern. In case of a change in the pattern of the ambient conditions by a predetermined amount within a second time period, the new event is indicated once more to the user.

20 Claims, 3 Drawing Sheets

(51) Int. Cl.

| | | |
|---|---|---|
| *H04B 1/56* | (2006.01) | |
| *H04B 1/44* | (2006.01) | |
| *H04J 3/16* | (2006.01) | |
| *H04W 52/02* | (2009.01) | |
| *H04M 1/725* | (2006.01) | |
| *H04M 19/04* | (2006.01) | |
| *H04W 4/12* | (2009.01) | |
| *H04W 68/02* | (2009.01) | |

(52) U.S. Cl.
CPC ......... *H04W 4/12* (2013.01); *H04W 52/0254* (2013.01); *H04W 68/02* (2013.01); *H04M 2250/12* (2013.01); *H04M 2250/60* (2013.01); *Y02B 60/50* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/166* (2018.01)

(56) References Cited

U.S. PATENT DOCUMENTS

| | | |
|---|---|---|
| 2002/0127998 A1 | 9/2002 | Katayanagi |
| 2003/0078499 A1* | 4/2003 | Eppstein ............... A61B 1/313 600/439 |
| 2005/0212869 A1* | 9/2005 | Ellson .................. B01L 3/0268 347/75 |
| 2007/0082707 A1* | 4/2007 | Flynt ..................... G06F 3/0481 455/564 |
| 2008/0220824 A1 | 9/2008 | Miyoshi et al. |
| 2009/0140853 A1 | 6/2009 | Nielsen et al. |
| 2011/0018996 A1* | 1/2011 | Mian .................. G08B 13/1672 348/143 |
| 2011/0151894 A1 | 6/2011 | Yang |
| 2011/0183650 A1 | 7/2011 | McKee |
| 2011/0300804 A1 | 12/2011 | Lu |
| 2012/0028625 A1 | 2/2012 | König |
| 2012/0252416 A1* | 10/2012 | Kissinger ............ H04M 19/04 455/412.2 |
| 2012/0286965 A1 | 11/2012 | Rautiainen |
| 2014/0019885 A1* | 1/2014 | Jung .................... G06F 3/0481 715/758 |
| 2014/0128032 A1* | 5/2014 | Muthukumar ........... H01Q 3/00 455/411 |

FOREIGN PATENT DOCUMENTS

| | | |
|---|---|---|
| JP | 2006303565 | 11/2006 |
| JP | 2009206868 | 9/2009 |
| JP | 2011035759 | 2/2011 |
| JP | 2012039254 | 2/2012 |
| WO | WO2009110393 | 9/2009 |

\* cited by examiner

METHOD AND APPARATUS FOR NOTIFYING MISSED EVENTS

This application claims the benefit, under 35 U.S.C. § 365 of International Application PCT/EP2014/052582, filed Feb. 11, 2014, which was published in accordance with PCT Article 21(2) on Aug. 28, 2014 in English and which claims the benefit of European patent application No. 13305185.4, filed Feb. 19, 2013.

FIELD OF THE INVENTION

The present invention pertains to a method of notifying events to a user. In particular, the present invention pertains to notifying again those events whose initial notification went unnoticed by a user.

BACKGROUND OF THE INVENTION

Many devices not only perform their functions when actually operated by a user, but also provide functionalities that create an output to a user without immediate prior interaction. Such devices include mobile phones, or telephones in general, which may receive calls or text or voice messages at any time, and further include personal digital assistants, or PDAs, which may inform a user of an upcoming event, e.g. an appointment, a general reminder, or a birthday, and the like. Such PDA functions may also be performed by corresponding software running on a mobile phone, a general purpose computer, a personal computer, a tablet computer or a laptop computer.

The events may be visually notified, e.g. by a message on a display screen or by lighting up an indicator lamp. The event may also be acoustically notified, e.g. by playing a sound associated with the event such as a ring tone or a message tone. The event may likewise be indicated by generating a tactile indication, e.g. vibrating the device or parts thereof, or by modifying a feature on a surface in such a way that it can be sensed, including retracting or extending a pin or the like, or applying a safe low voltage that is perceivable when a conductive surface is touched. The notification may also be effected by any combination of visual, acoustic or tactile indication.

An event notification is usually issued when the event occurs. However, a user may not notice the initial event notification, e.g. when the device is located remote from the user, i.e. out of sight, not within hearing distance, or not within touching distance. A user may also miss the initial event notification even though the device is not located remote from the user, e.g. when the device is stored away in a place that suppresses the indication such as a backpack or any other kind of bag, or when the place the user currently is in conceals the initial event notification, e.g. is noisy or distracting.

Devices issuing a notification are usually adapted to receive some form of user feedback, like confirming or dismissing a message that was displayed on a display screen, or cancelling an alarm, or the like.

Some devices will permanently repeat the indication until a user feedback is received, while some devices will repeat the indication at certain intervals. The time duration during which the indication is repeated may be limited to a predetermined time period.

Such repetition may still go unnoticed by a user and each time consumes energy. Such useless energy consumption is generally undesirable, in particular with battery operated devices.

In case of a missed initial event notification, and in case the device did not repeat the event notification, or stopped repeating the event notification after a certain time, the user would have to check if there was a missed event notification. Such checking may involve briefly activating the device for checking indications on a display screen, or for actively polling event notifications. If the device had been in power saving mode or sleep mode this checking usually includes switching on the backlight of the screen and looking at icons or other features represented on the screen that indicate a missed event. This is cumbersome and also unnecessarily consumes energy in those cases when no event had been missed. Some users may feel urged to regularly check if they missed an event, which may be inappropriate in certain situations. When the device is a battery operated device this may significantly reduce the remaining battery charge. Some mobile phone manufacturers, e.g. Nokia in their 6300 model, provide a light emitting diode that flashes in regular intervals in case an event has occurred and a user did not react upon this event. However, even this flashing of an LED is triggered immediately after the event occurred and is not limited in duration, thus unnecessarily consumes energy.

Many devices do not feature additional indicator LEDs for style reasons, for reducing the component count, or for reducing the openings in the housing for improved ruggedness or easier manufacturing. In this case the user has no other choice than to switch the device from standby or sleep to on every time the user suspects that there might have been a missed event notification, e.g. indicating a call or a text message that previously went unnoticed. Not only does this unnecessarily reduce the remaining battery charge in battery operated devices, but also such behavior, when repeated at short time periods, can be inappropriate or impolite in certain situations, and therefore be undesirable.

The present invention removes the need to switch on a device for checking event notifications that went unnoticed and provides a much more unobtrusive way of re-triggering or reissuing event notifications that previously went unnoticed.

SUMMARY OF THE INVENTION

Many devices, including but not limited to mobile phones, smartphones and tablet computers, are equipped with sensors of all kinds for monitoring ambient conditions. The sensors may include one or more of multi-axis motion sensors, including acceleration sensors and gyro-sensors, magnetic field sensors, e.g. as used for an electronic compass function, ambient light sensors, temperature sensors, proximity sensors and the like. If a user misses an initial event notification, i.e. did not react to the event notification within a certain time period, which may or may not be user adjustable, it may reasonably be assumed that there is a reason for the event notification going unnoticed.

In case of a portable device it may be assumed that the user does not carry the device. This could be verified using the sensors mentioned before, which detect if the device is in motion or motionless. In this case the sensors are used for detecting any motion after a period without motion. If the device is moved after a period without motion it can be inferred that the user picked up the device. At this time it is likely that a user would take notice of an event notification, and consequently the event notification is repeated. This is very convenient to the user as there is no need to switch on the device for checking. If there was no event requiring notification to the user while the device was not moved, there is no need to do anything. The user would recognize that, since no event notification is provided, there was no event.

If repeated movements of a certain same kind are detected, i.e. a reoccurring repetitive motion pattern, it can be inferred that the user carries the device in a pocket or in a bag or backpack or the like and simply cannot take notice of the event notification, i.e., does not hear an acoustic notification or cannot take notice a tactile or visual event notification. In this case the sensors are used for detecting changes in motion patterns, i.e. for detecting a motion pattern that is different from a preceding motion pattern which prevailed for a certain time. It is then assumed that the user can now take notice of an event notification, and the event notification is repeated.

The pattern may simply be defined by the amplitude of the motion, or by the direction of the motion, or both. For example, a change from a large amplitude motion to a small amplitude motion, from low frequency to high frequency movements, or vice versa, may be used for re-triggering an event notification. Also, a longer-lasting small repetitive motion having a first, relatively high frequency followed by a single large translational movement may be a good indication for a user being likely to take notice of an event notification.

In addition to activating the notification event in case of a motion pattern that differs from a motion pattern that was present when a user did not react to the event notification it is also possible to change the notification type or style when such repeated motion pattern plus missing user reaction is detected. E.g., when a mobile phone has been set to a lower-than-maximum volume for the ring tone, or a lower-than-maximum vibration setting, these settings could be overridden in case a user did not react to an event and repetitive motion of the same kind was detected. This provides a further possibility for the user to take notice of the event.

The repetitive motion of the same kind need not be predefined. In fact, it is preferable to activate a "learning mode" once an event notification for an event is triggered for the first time for that particular event. If a repetitive motion pattern is identified after activation of the learning mode, the sensors monitor the previously "learned" motion pattern and re-trigger the notification once a deviating motion pattern is determined. In case of "false alarms" that go unnoticed, this is not annoying to the user, since all that is lost is a small amount of battery charge.

Devices that are equipped with ambient light sensors may use these for retriggering an event notification. For example, when a device is carried in a pocket, the light sensor will not sense much ambient light. When the ambient brightness changes it can be inferred that the device has been removed from the pocket and a repeated event notification is likely to be noticed by the user. Ambient light detection may also work for devices that had been left motionless in a room, e.g. sitting on a desk, a shelve or the like. In case the ambient light in the room changes it can be inferred that a user is close enough to notice an event notification, issuance of which is consequently retriggered. In order to reduce false re-triggering of event notifications, preferably a significant change in ambient brightness has to occur within a predetermined time period. This prevents changes in daylight conditions, e.g. sunrise or sunset, from re-triggering event notifications. Brightness in this context refers to the amplitude of electromagnetic waves in a spectrum generally referred to as light. Light in this context may include parts visible and invisible to humans.

In a development the ambient light is monitored for a change in the light spectrum or wavelength. Such a change in the light spectrum or wavelength may indicate switching on or off of artificial light in a room that is in addition also lit by daylight. Also, other properties of artificial lighting may be used as re-triggering event. For example, fluorescent lamps may have a repetitive intensity variation that is linked to the mains frequency. Absence or presence of such variation pattern can be used for inferring whether or not a user is likely to notice a re-triggered event notification.

The invention may use temperature sensors in the same way as ambient light sensors. When a device is picked up by a user the temperature quickly rises and this change in ambient condition may be used for re-triggering the event notification. Or, when a device was carried on a person it may have heated up from the body temperature, and if it is now placed remote from the body the temperature will drop. This change in ambient condition may also be used for re-triggering the event notification, as it can be assumed that the user is still close enough to notice.

The various sensors may be used in any combination for improving the accuracy of the decision when to re-trigger an event notification. The combination may automatically be changed depending on past sensor readings, which may indicate that one or more sensor inputs would not provide useful and reliable results. Likewise, determining pattern is not limited to pattern for motion or ambient light. Rather, all ambient conditions that may show varying repetitive pattern can be used.

The time period provided for a user to respond to an initial event notification may be user settable. The time period provided for detecting a change in an ambience property or a monitored pattern by a predetermined amount as well as the predetermined amount may likewise be user settable, but may also be automatically set in dependence of the typical rates of change of the ambience property or pattern. The latter time period may also be different for each ambience property and corresponding pattern that is monitored, so as to take different rates of change of the ambience properties or pattern into consideration.

In case of doubt whether the change in ambient conditions, e.g. going from motionless to motion, was properly detected, a user may still want to switch on the device for checking. Such action is unnecessary in a development of the invention, in which a brief dedicated signal is issued by the device that indicates the absence of any missed event notification. While this consumes energy and reduces the remaining battery charge in a portable device, the dedicated signal may be less obtrusive than the actions of switching on the device and checking the screen. For example, the dedicated signal could be a soft audio signal or a brief vibration, which usually noticed only by the user holding the device and is overheard by others standing by. The dedicated signal to the user that indicates absence of a missed event may be user selectable. In a further development, the dedicated signal indicating absence of a missed event depends on the sensor it is triggered by. For example, in case of the brightness changing from dark to bright the dedicated signal may be a vibration, as it may be assumed that a user moves the device from a dark place to a brighter place. Or, in case of a motion detected the display might be briefly lit for indicating absence of a missed event. The dedicated signal may also be a combination of indications, and may likewise be depending on a profile selected by a user.

The invention does not require a user to unnecessarily activate a device for checking if he or she missed an event notification, while automatically providing such information as soon as the user is likely to notice such notification. The sensors involved typically use much less energy than having the screen lit up permanently or repeatedly at some time interval. Depending on the type of sensor and the typical rate of change of the ambient property measured by the sensor, the sensors need not be operated continuously, but may also be operated at appropriate intervals, thus further conserving energy.

In case the device has a data interface, the data interface may also be used as a sensor. For example, if a receiver for a geo-positioning system such as Global Positioning System, GPS, or GLONASS, is provided, the information available through the sensors may be used for inferring motion. This information can be used in the same way as described further above with reference to detecting motion. The geo-positioning information may also be used for achieving higher accuracy in combination with other motion sensors such as acceleration sensors, or gyro-sensors. In one scenario the sensor input may, e.g., indicate that the device is moving at a high speed. When the speed goes down, this may be a suitable time for re-triggering the event notification. The speed information may be combined with input from a microphone for improved accuracy, as higher speeds usually go along with increased noise levels. Moreover, the signal received by the microphone can be analyzed, e.g. for frequency spectrum. This aspect of the invention uses the finding that the frequency spectrum is significantly different if speech or audio is received when the microphone is exposed directly to the source or when the microphone is covered, e.g. in a bag or a coat pocket. Higher frequencies are usually much more attenuated than lower frequencies when covered by most types of covering material. Thus, the likelihood of the user perceiving the re-triggered event notification can be increased.

Other types of data interface that may be used for re-triggering the event notification include wireless local area networks, or WLAN, personal area networks, or PAN, such as Bluetooth, or near field communication interfaces, or NFC. For example, in case a device comes into the range of a WLAN to which it had been connected before, it can infer the environment. In this example, if the device comes into the range of a WLAN network in the home of a user, it may use this information for retriggering the event notification based on the assumption that a user may be in a quieter place than before. The identification of the network is easy by using the network's SSID information, or its equivalent. A similar scenario is conceivable with Bluetooth networks or NFC interfaces, or any other network, wired or wireless, that can be identified by an identifier, such as GSM, UMTS, LTE, or even AM or FM broadcasts. In case of AM or FM broadcasts a useful input may be the signal strength, or variations thereof, or the availability of a certain station at a certain frequency, indicating a user is in a location where a notification is likely to be noticed. Such condition may also be determined by "learning", i.e. the device may determine that with certain combinations of ambient conditions of different kind a notification is more likely to be noticed. The "learning" of combinations of ambient conditions for improved likelihood of a user taking notice of a notification is not limited to AM or FM broadcast, but may be applied to all sensor inputs.

In general, any sensor that provides a meaningful input allowing indication if a user is likely to notice a re-triggered event notification can be used for the present invention, including, further to those sensors discussed above, radiation sensors, humidity sensors, air pressure sensors, and the like. The sensors discussed in the foregoing are merely a non-limiting subset of sensors. Likewise, plugging of a power supply, of a wired data connection, a headphone or headset, or any other accessory, can be used for re-triggering the event notification, as these actions can be easily monitored and reliably indicate that a user is likely to take notice.

As discussed before, any useful and meaningful combination of the sensors discussed in the foregoing is also possible for improving accuracy.

The inventive method for re-triggering an event notification may be invoked immediately after an event had initially been notified, or after a user settable or preset delay has expired. The same applies to a further execution of the method if an already re-triggered event notification also had gone unnoticed. The delay may be adapted dynamically depending on the number of events notifications and re-notifications that went unnoticed.

A device in accordance with the invention has a display screen, a loudspeaker and/or a tactile feedback generator. The device further has a microprocessor, and program and data memory for storing and executing software that executes the method and data needed for or acquired when executing the method. The device further has sensors for monitoring the ambience of the device, e.g. a 2- or more-axis motion detector, a magnetic field sensor, an ambient light sensor, or any sensor in accordance with the method as described further above. The device is adapted to provide audible, visible and/or tactile messages to a user. An event may also be notified via an external connected further device, the connection being wired or wireless.

The method and device advantageously reduce energy consumption for event notifications that are likely to go unnoticed by a user. The method and device also free the user from having to repeatedly and conspicuously check for event notifications he or she may have missed, which may be inappropriate in certain situations.

The invention also relates to a computer-readable medium for non-transitory storing program instructions which, when executed on a computer, perform the method in accordance with the invention.

BRIEF DESCRIPTION OF THE DRAWINGS

The invention will be further described with reference to the attached drawings, in which.

DETAILED DESCRIPTION OF EMBODIMENTS

Figure 1:
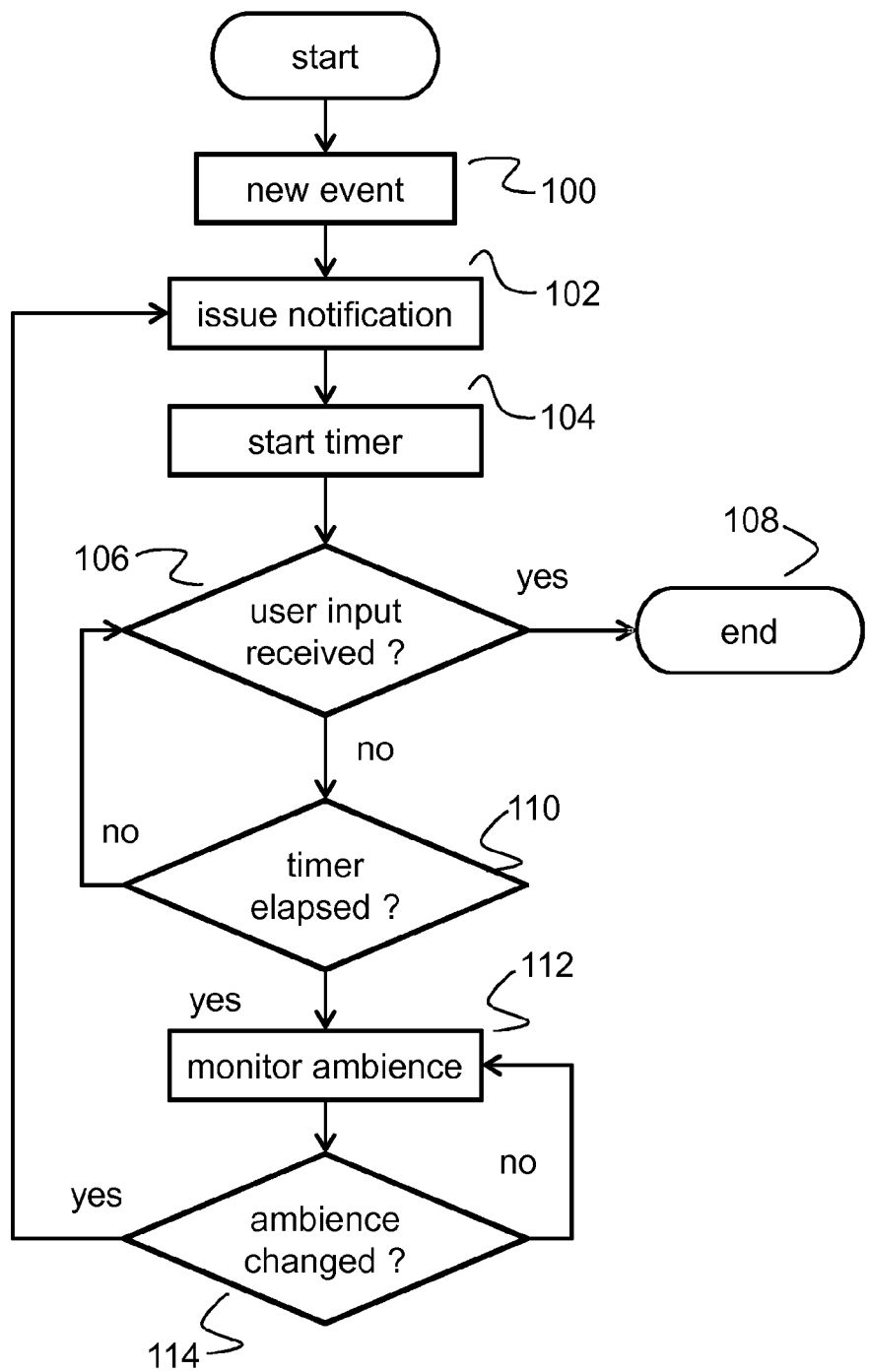
FIG. 1 shows a simplified flow diagram of the inventive method in accordance with a first aspect of the invention.

FIG. 1 shows a simplified flow diagram of a method in accordance with a first aspect of the invention. Once started, the method receives a new event in step 100, and subsequently issues an according event notification in step 102. After the event notification is issued to the user, a timer is started in step 104. While the timer is not elapsed, step 110, branch "no", reception of a user input in response to the event notification is monitored, step 106. In case such user input is received, the method is terminated, step 108. In case the timer is elapsed, step 110, branch "yes", the ambience is monitored by corresponding sensors. As long as the ambience does not change by a predetermined amount at a predetermined change rate, step 114, branch "no", the monitoring is continued, step 112, branch "no". If the ambience has changed fast enough and by an amount exceeding the preset amount, step 114, branch "yes", the event notification is re-issued, and the main part of the method, i.e. steps 104-114, is executed again.

Figure 2:
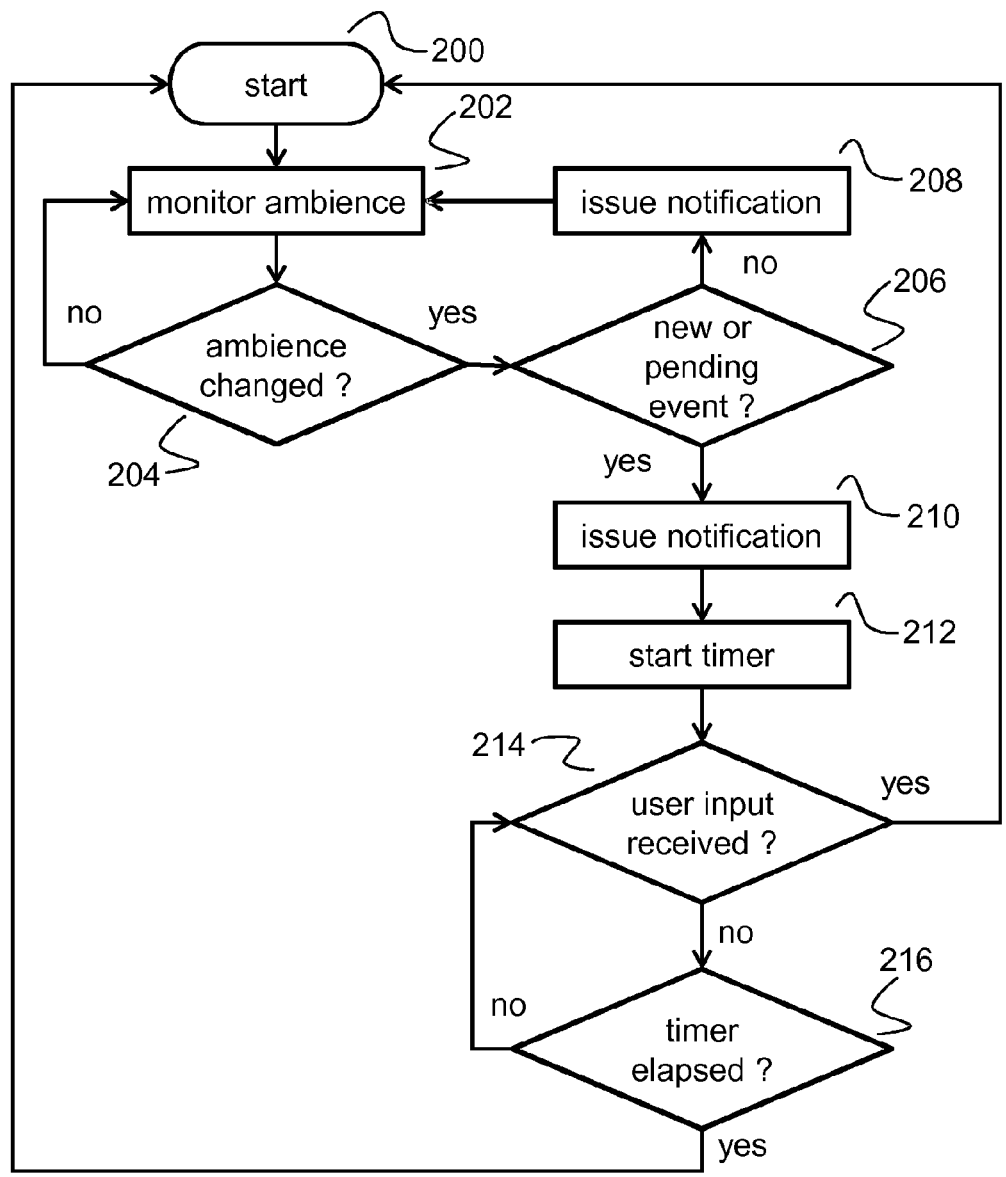
FIG. 2 shows a simplified flow diagram of the inventive method in accordance with a second aspect of the invention.

FIG. 2 shows a simplified flow diagram of a method in accordance with a second aspect of the invention. Once started, step 200, the ambience is monitored, step 202. Ambience monitoring is continued as long as the ambience does not change by a predetermined amount at a change rate exceeding a predetermined threshold, step 204, branch "no". If a change in the ambience is detected, step 204, branch "yes", the method determines if there is a new or pending event that requires notification to a user, step 206. In the negative case, step 206, branch "no", a particular notification is issued, step 208, for informing the user that no new or pending event requiring notification has occurred. The method then continues ambience monitoring, step 202. In the positive case, step 206, branch "yes", the event notification is issued, step 210. After issuing the event notification a timer is started, step 212. While a user input in response to the event notification is not received, step 214, branch "no", as long as the timer has not elapsed, step 216, branch "no", the method will wait for a corresponding user input. If a user input is received in response to the event notification, step 214, branch "yes", the method continues at the beginning, step 200. If a user input is not received in response to the event notification, step 2014, branch "no" and the timer has elapsed, step 216, branch "yes", the method likewise continues at the beginning, step 200. In this case the event remains to be notified as a pending event, see step 206. A pending event in this context is thus an event that had been notified before, but upon which a user did not react.

The method may be complemented by unconditionally issuing an event notification when an event occurs. Unconditionally in this context refers to the ambience monitoring. Any user setting preventing issuance of some or all notifications will override.

Figure 3:
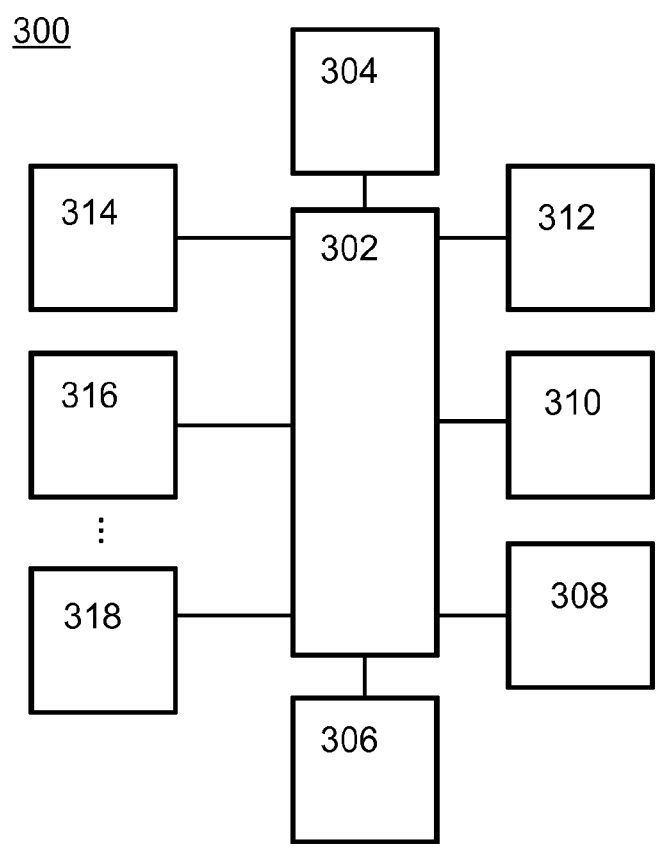
FIG. 3 shows an exemplary schematic block diagram of a device in accordance with the invention.

FIG. 3 shows an exemplary schematic block diagram of a device, 300, in accordance with the invention. Processor 302 is connected to a number of ambience sensors 314-318. Ambience sensors 314-318 may include communication interfaces such as LAN, WLAN, GSM, UMTS, LTE, infrared or other types wired or wireless communication interfaces. Processor 302 is also connected to program memory 306, in which software executing the method of the present invention runs. Program memory 306 may also hold data required for or acquired while executing the method. Program memory 306 may be of the volatile type, e.g. static random access memory, or SRAM, or dynamic random access memory, SDRAM. Other types of memory allowing running software are also possible. Program memory 306 may also be integrated in processor 302. Processor 302 is also connected to non-volatile memory 308, which may be an electric erasable and programmable memory, e.g. of the Flash-memory type, or any other non-volatile memory, like one-time programmable read only memory, or OTP ROM. The software executing the method may or may not directly run as a whole or in parts from the non-volatile memory, or may be copied as a whole or in parts to the program memory for execution. Processor 302 is also connected to a user interface 310, including but not limited to one or more of a display, a keyboard or touch-interface, an audio reproducing circuit including a speaker and an amplifier, a vibration generator, and the like. The user interface may provide a menu for controlling and activating or deactivating the method in accordance with the present invention. Among other functions the user interface may also allow for the user to set profiles. Such profiles may determine thresholds for distinguishing between ambient changes. Also, different profiles may trigger different notification types for specific events. Processor 302 is also connected to power supply 312, which may also supply power to the other components of the circuit (not shown).

Throughout this specification, the term "ambience" is used synonymously for the environment or surrounding of the device. More particular, "ambience" refers to those aspects of the environment or surrounding of the device that can be monitored using corresponding sensors, or that provide equivalent input signals that can be used for inferring whether or not a user is likely to notice an event notification.

The individual thresholds, time periods, and other parameters of the various sensors and method steps may be adjusted automatically or by a user to adapt to a user's individual needs or to a prevailing ambience, e.g. for reducing false re-triggering of event notifications.

The invention claimed is:

1. A method of operating a device for indicating an event notification, comprising:
 indicating a new event by accordingly issuing a visual, audible, or tactile indication,
 monitoring reception of a response to the indicated event,
 cancelling the indication of the event in case of a corresponding response, and when the indication for a particular new event is triggered,
 controlling sensors in the device to monitor one or more ambient properties,
 identifying if a repetitive pattern is present from the one or more monitored ambient properties,
 learning the identified repetitive pattern,
 continuing controlling the sensors to monitor the one or more ambient properties when no response to the indication of the event is received, and
 indicating the new event once more upon detecting a change in the identified repetitive pattern.

2. The method of claim 1, wherein controlling sensors in the device to monitor one or more ambient properties includes controlling sensors adapted for sensing one or more ambiance properties of the non-exclusive list comprising light, temperature, humidity, air pressure, strength or orientation of magnetic fields, motion, spatial orientation, noise level, type of power source, and availability of wired or wireless data connections.

3. The method of claim 1, wherein the new event is an audible or visible message, including but not limited to a text message, an email, a calendar appointment, a missed call indication, or an updated newsfeed.

4. The method of claim 1, wherein a time period for responding to the indication of the new event, a time period for detecting a change in one or more ambiance properties or the identified repetitive pattern or an amount of the change are settable or adjusted in response to a rate of change of a monitored ambience property.

5. The method of claim 4, wherein the amount of change in the ambient properties or in the identified repetitive pattern of the one or more monitored ambient properties in the corresponding time period is a differential value that is added to initial or base values of the ambient properties.

6. The method of claim 5, wherein the initial or base values of the ambient properties are automatically varied over time by lowpass filtering the respective initial or base values over a time period.

7. The method of claim 1, wherein the ambient properties are monitored or the identified repetitive pattern of the one or more monitored ambient properties is determined despite no new event indication, and wherein in case the change in the ambient properties or the identified repetitive pattern occurs while no new event is to be indicated, a specific indication is issued, indicating that no new event is to be indicated.

8. The method of claim 7, wherein the specific indication is an optical, acoustical or tactile signal that is different from an event notification.

9. The method of claim 1, wherein monitoring the ambient properties is carried out continuously or repetitively at time instants.

10. The method of claim 1, wherein the indication is a signal to a further device, non-perceptible to a human, wherein the further device issues a human-perceptible indication in response to receiving the non-perceptible signal.

11. The method of claim 10, wherein the non-perceptible signal includes modulated or unmodulated electromagnetic radiation in the non-visible spectrum and/or infrasonic or ultrasonic acoustic signals.

12. The method of claim 1, wherein individual or combinations of sensors to be used for monitoring ambient properties are selectable and wherein the corresponding changes in the identified repetitive patterns of the monitored ambient properties for triggering re-issuing an event notification are settable, including selection and setting through a selected profile.

13. Portable device having a microprocessor, a program memory, a data memory, and sensors adapted to detect ambient properties, wherein the program memory stores instructions that, when executed,
- indicate a new event by accordingly issuing a visual, audible, or tactile indication,
- monitor reception of a response to the indicated event,
- cancel the indication of the event in case of a corresponding response, and when the indication for a particular new event is triggered,
- control sensors in the device to monitor one or more ambient properties,
- identify if a repetitive pattern is present from the one or more monitored ambient properties, and
- learn the identified repetitive pattern,
- continue controlling the sensors to monitor the one or more ambient properties when no response to the indication of the event is received, and
- indicate the new event once more upon detecting a change in the identified repetitive pattern.

14. The portable device of claim 13, further including a display screen, a loudspeaker, a tactile feedback generator and/or a wireless communication circuit.

15. The portable device of claim 13, wherein the sensors include at least one of air pressure sensors, ambient light sensors, proximity sensors, temperature sensors, humidity sensors, magnetic field sensors, radiation sensors, power supply sensors, wired or wireless data connections, accessory detectors, position sensors, or motion sensors.

16. The device of claim 13, wherein the new event is an audible or visible message, including but not limited to a text message, an email, a calendar appointment, a missed call indication, or an updated newsfeed.

17. The device of claim 13, wherein a time period for responding to the indication of the new event, a time period for detecting a change in one or more ambiance properties or the identified repetitive pattern or an amount of the change are settable or adjusted in response to a rate of change of a monitored ambience property.

18. The device of claim 17, wherein the amount of change in the ambient properties or in the identified repetitive pattern of the one or more monitored ambient properties in the corresponding time period is a differential value that is added to initial or base values of the ambient properties.

19. The device of claim 18, wherein the initial or base values of the ambient properties are automatically varied over time by lowpass filtering the respective initial or base values over a time period.

20. A non-transitory computer readable medium having stored thereon a computer program product at least one of a downloadable from a communication network and recorded on a medium at least one of readable by a computer and executable by a processor, said computer program product including program code instructions for implementing a monitoring method of operating a device for indicating an event notification comprising:
- indicating a new event by accordingly issuing a visual, audible, or tactile indication,
- monitoring reception of a response to the indicated event,
- cancelling the indication of the event in case of a corresponding response, and when the indication for a particular new event is triggered,
- controlling sensors in the device to monitor one or more ambient properties,
- identifying if a repetitive pattern is present from the one or more monitored ambient properties,
- learning the identified repetitive pattern,
- continuing controlling the sensors to monitor the one or more ambient properties when no response to the indication of the event is received, and
- indicating the new event once more upon detecting a change in the identified repetitive pattern.

* * * * *